Oct. 20, 1970  R. DE LA COUSSAYE  3,535,186
DISPENSING MACHINE WHEREIN THE DISPENSING OF THE TAPE, CUTTING
OF THE TAPE, AND RESETTING OF THE DISPENSING MECHANISM ARE
CAUSED BY THE MOVEMENT OF THE OBJECT TO WHICH
THE TAPE IS TO BE APPLIED

Original Filed Jan. 26, 1966  3 Sheets-Sheet 1

INVENTOR:
RENÉ DE LA COUSSAYE
BY
ATTORNEY

Oct. 20, 1970          R. DE LA COUSSAYE           3,535,186
DISPENSING MACHINE WHEREIN THE DISPENSING OF THE TAPE, CUTTING
   OF THE TAPE, AND RESETTING OF THE DISPENSING MECHANISM ARE
       CAUSED BY THE MOVEMENT OF THE OBJECT TO WHICH
              THE TAPE IS TO BE APPLIED
Original Filed Jan. 26, 1966                 3 Sheets-Sheet 2

INVENTOR:
RENÉ DE LA COUSSAYE
BY *Norman S. Blodgett*
ATTORNEY

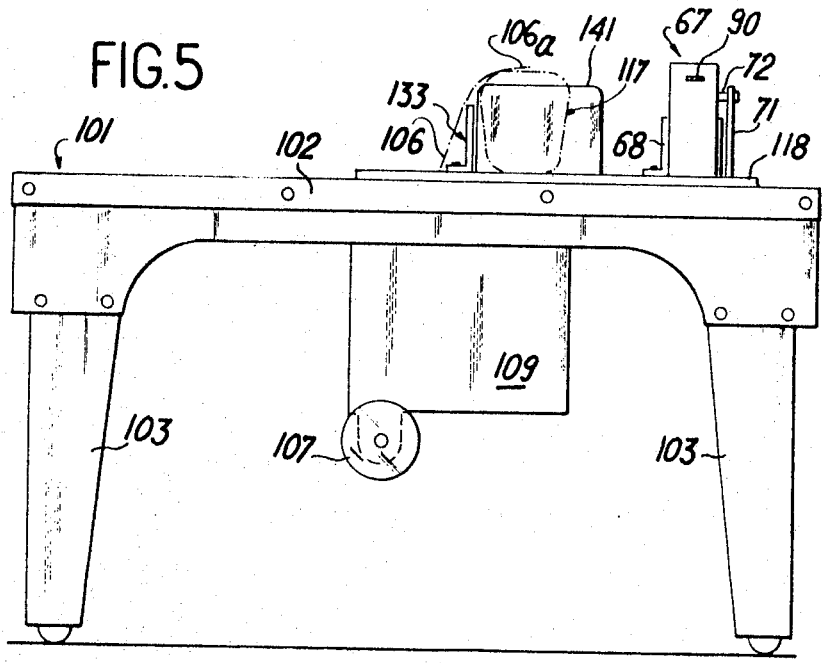
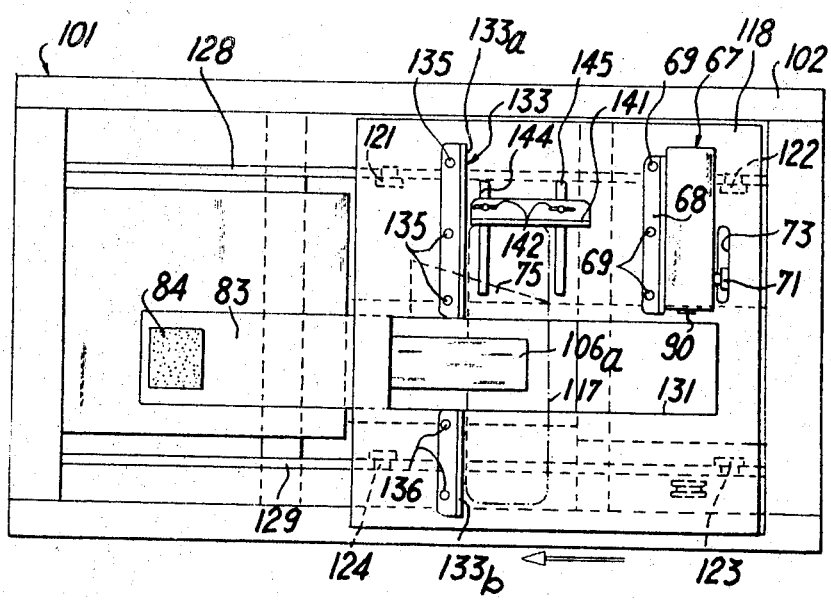

United States Patent Office 3,535,186
Patented Oct. 20, 1970

3,535,186
DISPENSING MACHINE WHEREIN THE DISPENS-
ING OF THE TAPE, CUTTING OF THE TAPE,
AND RESETTING OF THE DISPENSING MECH-
ANISM ARE CAUSED BY THE MOVEMENT OF
THE OBJECT TO WHICH THE TAPE IS TO BE
APPLIED
René de la Coussaye, 48 Rue de Tocqueville,
Paris 17, France
Continuation of application Ser. No. 523,216, Jan. 26,
1966. This application June 6, 1969, Ser. No. 834,589
Claims priority, application France, Jan. 27, 1965,
3,402; Jan. 19, 1966, 46,391
Int. Cl. B26d 5/28
U.S. Cl. 156—355
3 Claims

ABSTRACT OF THE DISCLOSURE

This invention has to do with a dispensing machine and, more particularly, to apparatus for dispensing, moistening, and applying a gummed band to a package for sealing the same.

---

Figure 1:
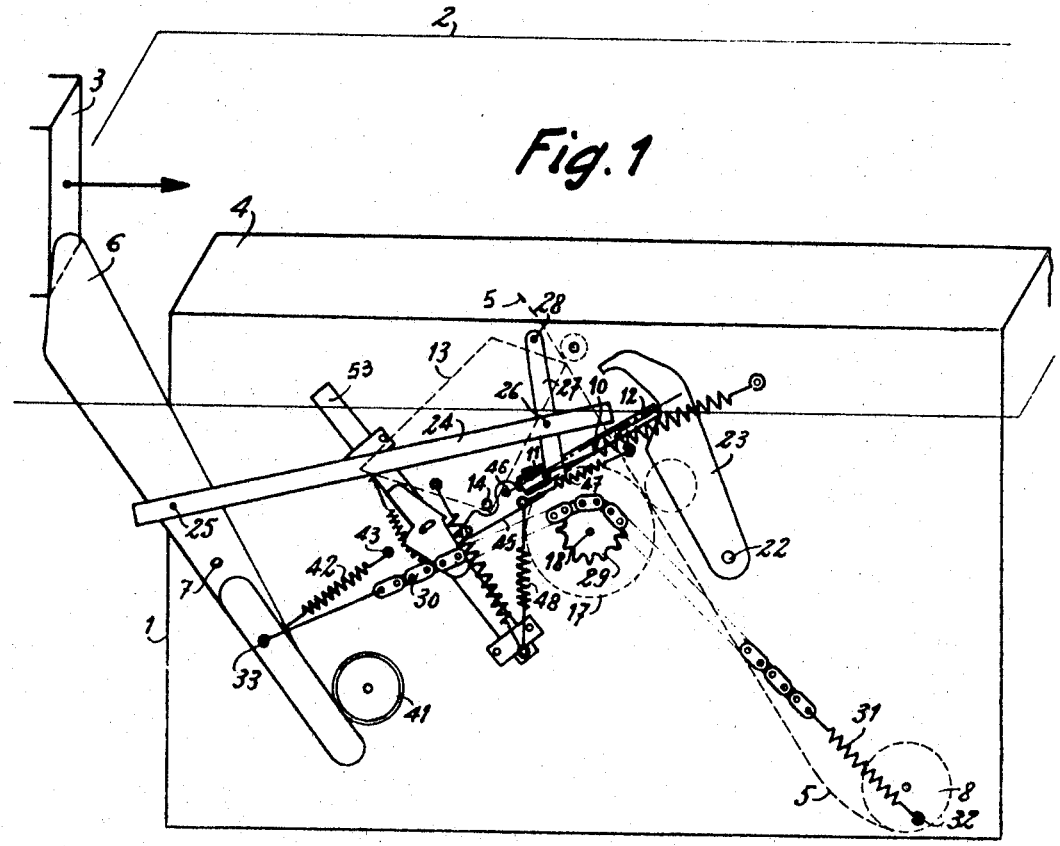

This case is a continuation of Ser. No. 523,216, filed Jan. 26, 1966, now abandoned.

A large number of dispensing machines have been developed, usually comprising means to effect more or less automatically at least a part of the operations of dispensing a pre-determined length of gummed and moistened band, putting it in place, passing on the box after sealing, and cutting the band. Some of these machines contain pneumatic or electric motors for providing the work necessary for operating the mechanism, and electro-magnetic control means for the sequence of operations including the transport of the box and the operation of the cutting device. The complexity of these devices make them cumbersome, and multiplies the possibility of failure or error. Some known machines employ relatively simple mechanical movements, but in this case the band feed is not usually automatic; in addition, at the end of the operations of applying the band on a package, a length of already moistened band remains projecting from the machine which may dry if the machine does not function for a certain time, this slowing the recommencement of operations on a new package. These and other difficulties experienced with the prior art apparatus has been obviated in a novel manner by the present invention.

The present operation has for its object the provision of a machine which avoids the previously mentioned disadvantages and which effects a complete cycle of operations of supplying a length of moistened band, applying it partially, and cutting it off by simple mechanical means, actuated by a pressure or traction exercised by the operator, or in some other suitable manner.

In general, a machine built in accordance with the invention comprises a structure of which the upper surface, provided with a suitable opening, constitutes a work surface on which the objects to be sealed are placed, and a dispensing means for the band supported in the structure, with means for dispensing a predetermined length of band; the latter comprises two rollers engaging the band; the machine also contains a cutting means and preferably a moistener, and a control mechanism for effecting the various operations. The said control mechanism comprises means moved solely by the movement of the object on the work surface, and during a first phase of the movement, or by a corresponding movement of a support plate, turns one of the distributor rollers which is in contact with the other roller and thus furnishes a predetermined length of band towards the moistener, in a direction opposite to that of the movement of the package; means driven by the movement of the package during the second step of its progress to halt the dispenser by separating the two rollers, to enable the operator or possibly an automatic mechanism to pull on the band while continuing to traverse the package so as to encircle it more or less completely with the moistened band; the said progressing and roller separating means comprising a first spring assembly which has absorbed energy during the two first movements described above, the cutting means being normally maintained in a closed or prepared position by a catch, and then by means of a spring under tension, so that the release of the hook produces a sudden movement of the spring and cutting of the band; the progress of the bonded package beyond the work position releases, at the commencement of the third period of the operations, the spring assembly, this having as a first result, at the end of the third period, of tilting the catch and effecting band cutting, and then during a fourth period and eventually of a fifth period, separating the distributor rollers and resetting the cutting mechanism in order to restore the machine to its original position for commencing a new cycle of operations.

Figure 2:
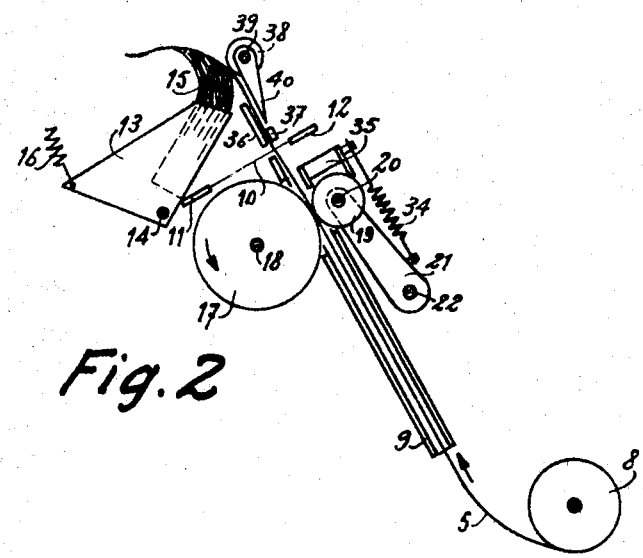
Figure 3:
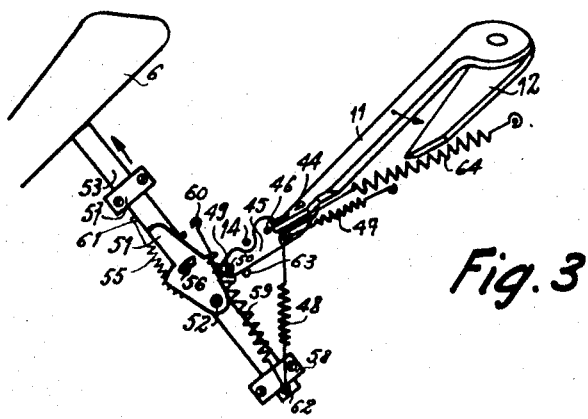
Figure 4:
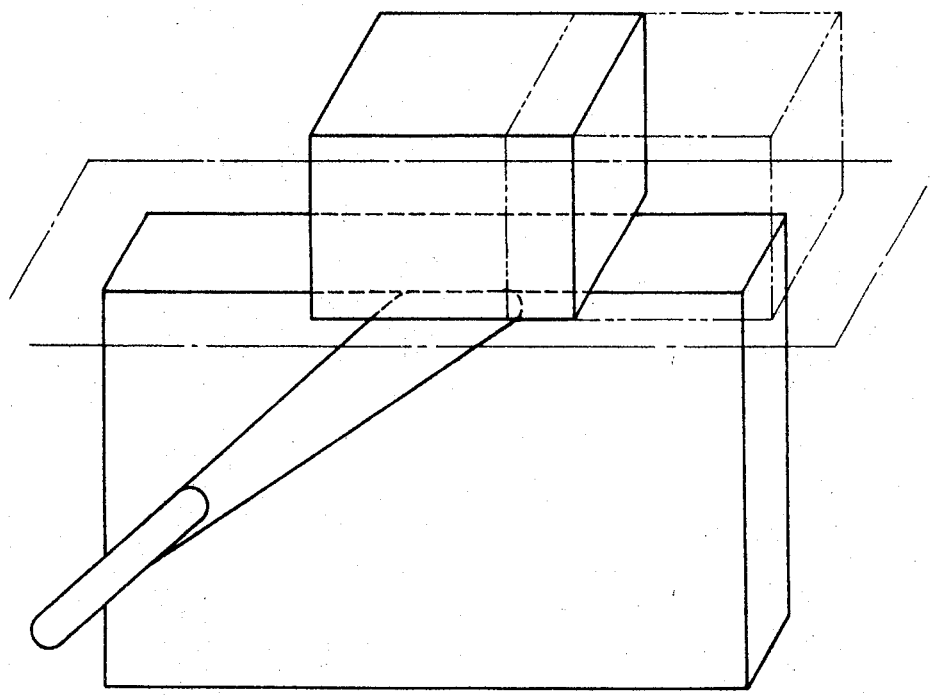

The character of the invention may be best understood by reference to one of its structural forms, as illustrated by the accompanying drawings in which:

FIG. 1 is a perspective view in perspective of a machine according to one form of the invention, FIG. 2 is an enlarged view of the rollers, dispenser and band moistener, FIG. 3 shows details of the cutting mechanism and of the corresponding part of the control device, FIG. 4 shows the layout of the control mechanism while moving the box to be bonded, FIG. 5 shows an alternative construction according to the invention in which the machine is provided with a movable platform supporting the package to be wrapped, FIG. 6 is a plan view of FIG. 5, the same reference numbers designating the corresponding items in the various figures.

The machine shown in FIG. 1 comprises a box 1 or casing located beneath a work surface 2 (shown partially) on which the operator pushes a box 3 in the direction of the arrow. In order to simplify the drawing the means for guiding the box into a correct location have been omitted. This means locate the box relative to an opening 4 in the table in order to dispense the gummed band 5 and to ensure operation of a lever 6. The latter, pressed by the box, pivots about an axis 7 and produces the whole cycle of operations of dispensing, moistening and cutting the band as explained below.

A roll 8 of gummed paper is supported by an unrolling device which comprises suitable means for tensioning and braking of the band. At the commencement of a cycle of operations which results in sealing a box, the box encounters the lever 6 as shown in FIG. 1. The band is located in a guide slide 9 which terminates on the level of the cutting plane shown in FIG. 1 by a chain dotted line 10. As shown, the band has been cut at this level during the preceding cycle. At the end of each cycle there is no moistened portion of the band left in the machine.

In FIG. 2 certain particulars of FIG. 1 are shown, including the roller 8, the guide slide 9, the movable knife 11 and a fixed plate 12 at the end of which is pivoted the means for furnishing a predetermined length of band (these two items are shown in perspective in FIG. 3), and the moistener. The latter comprises a water reservoir 13, which pivots about an axis 14 carried by the framework of the machine and a brush 15. A spring 16, one end of which is fixed to the framework, is tensioned so as to pivot the reservoir in such a way as to apply the brush to the gummed side of the band 5.

The dispenser comprises a lower roller 17 pivoted at 18, this pivot rotating in bearings in the front and back of the casing, and an upper roller 19, rotatable about axis 20 fixed to the end of lever 21 which pivots about an axis 22. The latter rotates in bearings at the front and back of the casing, and also produces a pivoting action on a lever 23 located outside the casing. The lever 23, as seen from FIG. 1, can be pushed towards the right by a rod 24 pivoted at 25 on lever 6, and at 26 to a lever 27 which pivots about an axis 28. The lever 21 is, in turn, urged towards the left by a spring 34, one end of which is fixed to a member 35. It is obvious that movement of the lever has the effect of engagement or disengagement of the two rollers 17 and 19 by movement of one with respect to the other.

Slots provided in the slide 9 permit engagement of the two rollers, which in a closed-together position dispense the band 5. This dispensing action is effected by rotation of the roll 17 in the direction of the arrow (FIGS. 1 and 2) the latter being effected by rotation of a pinion 29 (see FIG. 1) in a counter-clockwise direction. This pinion is itself driven by a chain 30 tensioned at one end by a spring 31 fixed to a member 32 carried on the front end of the casing, the chain being attached at its other end to point 33 of lever 6.

Rotation of the pinion in a clockwise direction does not drive the roller 17 since a free-wheel mechanism is provided but not shown. Between the cutting plane 10 and the brush 15 the band 5 is guided between two members 36 and 37 (FIG. 2) fixed by means not shown to the casing 1, while a roller 38, which pivots freely with a certain amount of play around a pivot 39 fixed to casing 1, ensures contact with the brush. A shutter 40 pivoted at 39 is applied against the band in order to maintain it flat, even though the operator pulls the band askew.

A description will now be given of the control mechanism with reference to FIGS. 1 to 3, of which parts 6, 23, 24, 27, 29, 30, and 31 have already been mentioned. The lever 6 is normally held against a stop 41 by a spring 42 fixed at 43 on the front of the casing 1. The knife 11 has a hole 44 (FIG. 3) at one end, normally engaged by one end of a double catch 45 which pivots about axis 46 fixed to the front face of the casing 1. Two springs 47 and 48 of which one end of spring 47 is fixed to the said casing and of the other spring 48 to a slider 53, normally hold the catch to maintain the knife in the ready position.

The other end of the catch 45 carries a pin 49 over which a projection of cam 51 slides while descending and engages while moving upwards. The said cam pivots about an axis 52 fixed to a slide 53 and has a slot. The cam is normally tensioned towards the right by a spring 55 of which one end is fixed to the slide 53, this movement to thte right being limited by a stop 56 fixed to the slide 53.

The slide 53 moves over the surface of the front face of the casing 1 on which two bridge pieces 57 and 58 are fixed, which permit the sliding movement while maintaining the slide in contact with the said casing. The slide is normally impelled in the direction of the arrow (FIG. 3) to a position defined by stops 61 and 62 by means of a spring 59 of which one end 60 is fixed to the front face of the casing 1.

After the catch 45 is turned in a clockwise manner to immobilize the cutter, its return anti-clockwise movement under the action of springs 47 and 48 is limited by a stop 63 carried on the front face of the casing 1.

The operative cycle of the machine comprises the successive time periods or steps described below.

The first period, which corresponds to the first step in the progress of the box to be sealed, commences at the moment when the box starts to push the lever 6 (FIG. 1). During this first period, the pinion 29 is driven in an anticlockwise direction and as a result, the roller 17, which is in contact with the roller 19, draws the band in the direction of the arrow (FIG. 2). The end of the first period terminates at the movement when the rod 24 commences to turn the lever 23 and the lever 21 is mounted on the same axis 22, thus separating the roller 19 from the roller 17. During the second period, which corresponds to a second step in the travel of the box, the dispenser 17, 19 is disengaged from the band so that the operator can easily seize the moistened portion of the band which has been carried above the work surface through the opening 4 (FIG. 1) and pull the band, which slides through the guides and over the brush, remaining centered with respect of the longitudinal plane of symmetry of the opening.

The operator applies the band, which sticks itself on the box, without moving the box backwards, so that the lever 6 remains held by the box in the position shown in FIG. 4, in which the springs 31, 42, 48 and 59 are held under tension. FIG. 4 shows that the upper end of the lever is located at the level of the work plane so long as the box remains located on this plane.

The third operational period commences at the moment that the box, pushed by the operator at the end of the band application, moves beyond the position represented dotted in FIG. 4, and frees the lever 6 which is rapidly returned to a starting position by its springs. During this return movement of the lever 6, the roller 17, as explained above, is not driven so that the paper band is not dispensed.

At the end of this third period, the cam nose 50 (FIG. 3) pushes the end 49 of the catch 45 and thus turns the catch so as to free the knife. The knife, under the action of the spring 64 (FIG. 3) one of which is fixed to the front facing of the casing 1, is moved rapidly against the fixed blade 12 and cuts the band. This method of cutting, although not the only one, is particularly effective and can correctly cut even a reinforced gummed band.

At the end of the third period, while the lever 6 continues this return movement, the end of the lever 24 is disengaged from the lever 23 so that the spring 34 (FIG. 2) can restore the lever 22, thus producing re-engagement of roller 19 with the roller 17. The band dispenser is thus restored to its operative position (fourth period).

A fifth period commences when the lever 27 (FIG. 1) presses against the cutter 11 which occupied its cutting position during the fourth period. At the end of this fifth period, which terminates the cycle, the cutter 11 has been reset.

Thus, all the work necessary to perform the cycle of operations has been furnished by a single pressure applied by the box to the lever 6 during the first two periods of the cycle, without the use of any motor device. The work necessary to carry out the following periods is furnished by the return of the lever 6 under the influence of its springs which have been tensioned during the two previous periods. This return motion of the lever is initiated by the passing-on of the package being sealed.

It is obvious that the series of operations of the system could be carried out by alternative means capable of fulfilling the same purposes as those shown in the drawings although the latter, since they are both simple and effective, are preferred in the present invention.

It should be noted in addition that the means for unrolling, guiding and moistening the band could be otherwise embodied. The same thing applies to the dispenser, of which essential features is its automatic disengagement, under the action of a single operating lever in order to permit the operator to draw freely the required length of the band above the work surface.

Another important variant concerns the operation of the lever 6 or of any equivalent device such as a cam. The operator could act on this lever or on a movable table either by pressing manually thereon or by means of a pedal. It is also possible to effect an automatic displacement of the object to be wrapped and even the application of the band thereto by automatic means without departing from the scope of the invention.

Finally, it could be advantageous to incorporate a moving plate in the machine. The package to be wrapped is placed on this plate, and it is the movement of the latter which acts on the lever 6. In this manner, the package is not subject to the back pressure of the control mechanism except through the intermediary of the plate and, therefore, there is no risk of damaging the package.

FIGS. 5 and 6 show such an embodiment of a machine according to the invention. The machine comprises a structure designated 101 and includes a horizontal rectangular frame supported on four feet 103 so as to form a kind of table of convenient height resting directly on the floor.

The roll of paper 106 is in the form of a bobbin similar to 8 in FIGS. 1 and 2, but it could be formed alternatively from a paper band or other packingstrip for covering the object 117. In the latter case, the moistener 13, 14, and 15 of FIGS. 1 and 2 is omitted. The mechanism of the system shown in FIG. 1 is represented by the inclusive reference 109, the lever 6 not being shown.

Each object to be wrapped, for example a loaf of bread 117, is carried on a moving platform 118 also of rectangular form, but smaller than the top of the table 101 and mounted so as to slide on it in the direction of its length. To this end, the lower face of the mobile platform 118 carries four rollers 121, 122, 123, 124 running on two rails 128, 129, parallel to the two long sides of the table and fixed to the frame 102. All the four rollers are similarly mounted and each of them, for example the roller 122, can rotate free on a pivot located in two supports on the lower face of the moving plate 118.

This plate 118 has a large slot 131 extending in the direction of movement of the said plate above the bobbin and of which the size is greater than that of the said band; this slot corresponds with the opening 4 of FIG. 1.

The moving plate 118 is provided with means for locating an object to be wrapped above the slot 131. These locating means comprise a transverse fixed guide and comprising two angle brackets 133a, 133b fixed to the upper face of the moving plate 118, for example, by means of rivets 135, 136. The brackets are located on each side of slot 131 and in a plane perpendicular to it, in such a manner that the two vertical sides of these brackets are in the same vertical transverse plane to form together a locating face 133.

The locating means also comprise an adjustable longitudinal guide 141 formed from another angle bracket of which one portion is located against the upper face of the plate 118 by studs 142 preferably fitted with wing nuts, the studs passing through slots 144, 145 formed in the plate 118 in a direction perpendicular to that of the slots 131. It is thus possible to adjust the position of the longitudinal guide 141 by moving it parallel to itself along the slots 144, 145 to accommodate the length of the object 117 to be wrapped, which is placed against the said longitudinal guide 141 so that its center portion coincides with the slot 131.

If the band 106 is a wrapper which is not gummed, the moving plate 118 may carry a dispenser of adhesive ribbon for delivering a predetermined length thereof, preferably adjustable, shown in the drawing at 67. This dispenser is fixed on the moving plate in any suitable manner, preferably in such a way that it can be readily removed. In the drawing, it is simply laid on the plate 118 and located by a bracket 68 fixed on the plate by rivets such as 69, and by auxiliary locating studs (not shown on the drawing) so as to permit removal of the dispenser when required, as for example while cleaning the machine, the moving plate 118 being easily removable also, since its rollers only rest on the two rails 128, 129. The adhesive ribbon dispenser 67 is provided with an operating lever 71 mounted on a horizontal pivot 72 which rotates in the body apparatus. The lever 71 traverses the moving plate 118 in a slot 73 perpendicular to the direction of the large slot 131 of the plate. This lever 71 is moved during the forward movement of the mobile plate, i.e., from right to left on FIGS. 5 and 6 by a cam 75 fixed on an extension of the framework. Preferably, this cam is formed so that its slope is adjustable so that the movement of the lever 71 can be increased or diminished so as to determine the length of ribbon dispensed during each operation.

A horizontal plate 83, fixed to the table top 102, carries a pad 84 of springy material, such as expanded plastic, of which the upper face is approximately level with the lower face of the moving plate 118 so as to apply the band of paper against the lower face of the object 117 to be wrapped.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A dispensing machine for applying a strip of sheet material to an object in which the actions of dispensing a predetermined length of strip, freeing the strip from the dispensing means, cutting off the strip, and returning the apparatus to a starting condition are all performed as a result of movement of the said object, comprising
 (a) an activating lever which is moved by the said object and effects the said actions,
 (b) a dispensing means consisting of two rollers, one of which is driven by a sprocket and chain, the said rollers being spring-urged toward one another during the dispensing operation so as to grip and forward the strip by a predetermined amount,
 (c) an operating lever which activates a serving knife,
 (d) a rod pivoted on said operating lever and said activating lever, said rod bringing about separation of the rollers at the end of the dispensing operation, by acting on another lever on which one of the rollers is rotatably mounted to cause said separation,
 (e) a table having an elongated slot through which the strip passes,
 (f) guides by which the object is located on the table,
 (g) means by which the strip is unrolled from a supply,
 (h) a guide located within the dispenser through which the strip passes,
 (i) a severing knife which traverses across the path of the strip, and
 (j) a moistening brush over which the strip moves the strip as it emerges from the slot.

2. A dispensing machine as recited in claim 1, wherein moisture is obtained from a tiltable reservoir and the brush is in contact with water in the reservoir.

3. A dispensing machine as recited in claim 1, wherein the said knife is moved to a cutting position against spring pressure during an initial movement of the said object and thereafter released, its movement serving to move the strip against a guide plate.

References Cited

UNITED STATES PATENTS

| | | | |
|---|---|---|---|
| 2,721,670 | 10/1955 | Shenigo | 156—522 X |
| 2,726,786 | 12/1955 | Grickson | 156—486 |
| 2,799,419 | 7/1957 | Scheib | 156—522 X |
| 2,787,396 | 4/1957 | Christensson | 156—355 |
| 3,206,912 | 10/1965 | Neubronner | 156—522 X |
| 3,229,594 | 1/1966 | De la Coussaye | 156—522 X |

JOHN T. GOOLKASIAN, Primary Examiner

J. C. GIL, Assistant Examiner

U.S. Cl. X.R.

93—36.9; 156—361, 486, 490, 516, 522, 524, 533, 578